3,122,599
PROCESS OF MAKING LEATHER-LIKE MATERIAL
Shu-Tung Tu, Ipswich, and Robert A. Whitmore, Beverly, Mass., assignors to United Shoe Machinery Corporation, Flemington, N.J., a corporation of New Jersey
No Drawing. Filed Mar. 27, 1961, Ser. No. 98,318
6 Claims. (Cl. 264—299)

This invention relates to the preparation of tanned collagen fiber masses and particularly to the preparation of a leather-like sheet material.

In United States Letters Patent No. 2,934,446, issued April 26, 1960, in the names of John H. Highberger and Robert A. Whitmore, entitled "Collagen Fiber Masses and Methods of Making the Same," there is disclosed a method for forming interlocked collagen fiber masses. That method involves forming a mixture of existing collagen fiber and collagen in aqueous solution at a controlled ionic concentration and pH, and maintaining the mixture at a temperature below about 5° C. to prevent precipitation from the collagen solution. The cold mixture is shaped as desired, for example, into sheets. Thereafter, by warming, the collagen fibers are precipitated from solution in interlocking relation with the existing collagen fibers to form a skin-like material. This skin-like material is capable of being tanned to a leather-like condition either with or without intermediate treatments.

Operation under the process of the above-identified application involves the problems of maintaining the mixture below 5° C. during shaping, and of warming the shaped mixture under controlled conditions. The product obtained after precipitation by warming is at a pH value of from about 5.2 to 9.5 and it is necessary, in order to convert this to a leather-like condition, to immerse this material in an acid solution of a tanning agent such as a chrome or vegetable tanning agent.

It is an object of the present invention to form a shaped collagen fiber mass from dissolved collagen by a procedure which eliminates the necessity for this control of temperature.

It is a further object of the invention to provide a simplified method for forming a leather-like sheet from dissolved collagen material mixed with existing collagen fibers.

To this end and in accordance with a feature of the present invention, we have devised a process for making a shaped interlocked collagen fiber mass by bringing together in a single pasty mixture all of the important components for such interlocked fibrous mass including existing collagen fibers, collagen in solution and an agent capable of reaction with collagen and of precipitating it from solution. The mixture is shaped before such precipitation and thereafter the reaction and precipitation are completed to form a shaped interlocked collagen fiber mass.

We have discovered a new process involving control of pH and other conditions in the single pasty mixture to provide a collagen fiber slurry with stability and inter-fiber slip for effective shaping, coupled with desired reactivity characteristics for precipitation of collagen from solution after shaping.

In solutions more acid than about pH 5.2 collagen molecules in solution have net positive charges which prevent their aggregation into fibers and precipitation. Reaction of chromium compounds with collagen molecules alters this situation and may precipitate chromium-collagen fibers at pH values as low as about 2.5. The speed of reaction of collagen with chromium compounds may be reduced by the use of significant proportions of so called masking agents; and these masking agents are effective to give high combined chromium contents even at relatively high pH values up to about 5. These higher pH values, however, approach the isoelectric range of collagen fibers so that the handling of fluid masses of existing collagen fibers in an aqueous medium becomes more difficult. Thus, the mixtures may develop "ropiness" in the course of mixing a such pH values and develop serious resistance to effective shaping. Also the final strength of such mixtures is markedly poorer.

Following the method of the present invention, an acidic aqueous solution of collagen is mixed with existing collagen fibers and with a collagen reactive chromium compound, usually a chromium tanning agent, containing at most a limited amount of masking agent, the mixture having a pH in the range of from about 2.5 to about 5, preferably from about 3 to about 3.5. In a preferred form of the process, this mixing is carried out at relatively low temperatures which are below about 10° C., since the low temperature has been found markedly to reduce the rate of reaction between the collagen and chromium compound and to extend the time before precipitation of collagen from solution is effective to hold existing collagen fibers against displacement. This acidic mixture is shaped, usually into a sheet, during the period in which the collagen has not yet precipitated and is then maintained in this shape until precipitation has occurred.

This reaction to precipitate collagen from solution to form fibers holding the existing collagen fibers against displacement is a different phenomenon from the thermal precipitation of collagen from solution under conditions of controlled ionic strength and higher pH values taught in the Highberger et al. patent referred to above, and will occur although more slowly, even at the low temperature at which mixing is carried out. The reaction between the collagen and chromium is expedited by increasing the temperature of the shaped mixture. But, even at higher temperatures, the precipitation is not the thermal precipitation described in the patent and is carried out at pH values at which the thermal precipitation of the patent would not occur.

Collagen solutions useful in the present process may be formed by procedures known per se, such for example as the procedure shown in the patent of John H. Highberger and Robert A. Whitmore referred to above. The procedure may include the steps of roughly grinding young mammalian skin, suitably calfskin, and dispersing the ground skin material in an aqueous acid bath at a pH of from 2 to 4.5. Usable acids include formic acid, acetic acid, propionic acid, citric acid, phosphoric acid, hydrochloric acid, sulfuric acid and other common organic and mineral acids which do not precipitate protein. The skin material is allowed to stand at a temperature below 25° C. and preferably near 0° C. for from 12 to 48 hours. The acid bath containing skin material is then preferably passed through a mechanical device to subject it to severe shearing action which brings the product to a pasty condition in which a high percentage of the collagen of the original skin material appears to be in solution.

Hide fiber material for combination with collagen solution may be prepared by the procedure described in greater detail in the copending application of Frederic C. Merriam et al., Serial No. 846,254, filed October 14, 1959, now Patent No. 3,063,892, and entitled "Preparation of Hide Fiber," now U.S. Patent No. 3,063,982, granted November 13, 1962. As described more fully in that application, skin or hide material, such as limed unhaired hide, pickled hide, or unlimed hide, is washed, subdivided into pieces, preferably not smaller than one inch, and preferably chemically treated as by limited formaldehyde tannage to reduce the swelling tendency of the collagen fibers of the skin or hide. The treatment, which should be sufficient to provide at least 1/10% of combined formaldehyde based on the dried weight of the fibrous material and preferably not over 2%, brings the skin or hide material to a condition in which it can be reduced most effectively to its separate fibers.

The hide material is placed in water and subjected to a mechanical device which may be similar to a paper-beater, involving relatively moving surfaces which exert a shearing action for pulling or teasing the hide material into its constituent fibers and forming a pulp or suspension of the fibers in water.

The fibers, a collagen reactive chromium compound, usually a chrome tanning agent, and collagen solution may then be mixed in suitable mixing equipment. The collagen solution is acidic having a pH usually around 3.5 and the fibers are somewhat more alkaline, so that it may be necessary to introduce acid to give the desired pH value. This acid may be added to the fibers before mixture with the other components.

In such a mixture there may be used, based on the combined weight of existing collagen fibers and dissolved collagen, at least 0.2% by weight, or, where tanning is desired, from 1.5% to 5.0%, preferably from about 2.5% to about 3% by weight of chromium calculated as $Cr_2O_3$. A controlled amount of masking agent may be used.

Compounds effective in aqueous solution to react with and precipitate collagen from solution include the water soluble compounds of trivalent or hexavalent chromium. In particular, the compounds formed by partially neutralizing chromic salts such as chromic chloride and chromic sulfate give very desirable results. The reaction of these chromic salts with alkaline material brings the salt first to the stages referred to by tanners as "one-third basic" and then to higher basicity up to as high as about 50% basic. Use of the basic chromium solution not only precipitates collagen from solution but also tans both precipitated and existing collagen to give a desirable relatively high "shrink temperature." The chromium solutions desirably contain about 1% chromium by weight calculated as $Cr_2O_3$ although somewhat higher and lower concentrations have been used.

Speed of reaction may be controlled by controlling the temperature, the pH value, the proportion of masking agent or other salts to the chromic complex and the concentration of the various components. Ordinarily, the reaction will be carried out at temperatures below about 10° C. to slow down the reaction. Higher temperatures may be used where efficient mixing and shaping devices allow these operations to be completed rapidly. However, at present it appears that more uniform and intimate association of the collagen solution and of the existing collagen fibers is obtainable at lower temperatures.

A masking or complexing agent such as the ammonium and alkali metal salts of formic acid and of hydroxy carboxylic acids including sodium tartrate, sodium phthalate or sodium gluconate may be used with the chromic salts, these agents being capable of forming complex molecules with the products formed by partial neutralization of the salts. The amount of such agent used may vary from zero for operation at a pH of about 2.5 to 3 up to higher percentages at higher pH values. A ratio of from 2 parts of chromium compound calculated as chromium oxide to one part of the agent by weight, e.g. 1% chromium by weight calculated as $Cr_2O_3$ with 0.5% of sodium formate by weight in the solution is useful at pH of 3.5 to 3.9, and ratios up to 4 parts by weight of the agent to one part by weight of the chromium are useful at higher pH values.

The mixture of existing collagen fibers, collagen solution and chromium solution is shaped after mixing and before reaction and precipitation of collagen from solution. The mixture may be given any desired shape and thickness since no further contact with external reagents is required. Ordinary shaping involves extrusion or rolling of the material into a layer which on completion of the reaction and finishing will be a leather-like sheet material.

Mixtures suitable for conversion to sheet form by extrusion or rolling may have a solids content (combined fiber and dissolved collagen) in the range of from about 5% to about 20% by weight, preferably about 10% to about 15% based on the weight of the mix. The dissolved collagen may be present to the extent of from about 5% to about 20% by weight, preferably about 10% to 12% based on the combined weight of fibers and dissolved collagen.

The combination of chrome tanning agent with collagen provides as a known characteristic the increase of the shrink temperature of the collagen fiber. It appears that where the chrome compound is a tanning material, the chromium acts on the collagen materials and the heat resistance-increasing effect of the chromium exerts itself on the collagen components even before a full tanning. That is, full reaction of the chromium material with the collagen material can be speeded up without detriment to the collagen by warming the chromium bath to a temperature which may be as high as 50° C. Rapid and complete interaction is obtained with no observable degradation of the collagen even though heating a solution of collagen to so high a temperature would result in at least partial degradation of the collagen.

The shaped product of mixing existing collagen fibers, dissolved collagen and chromium solution after precipitation of collagen may be treated according to known procedure. It may be dyed with water soluble acid or direct dyestuffs. The product may be treated to incorporate a humectant, e.g. sorbitol, and/or a fat liquor such as an emulsion of neat's-foot oil. Where the product is in sheet form it may be desirable to subject it, preferably after drying, to a needling operation such as that described in the copending application of Shu-Tung Tu and John H. Highberger, Serial No. 805,032, filed April 8, 1959, now Patent No. 3,073,714, and now U.S. Patent No. 3,073,714, entitled "Improved Collagen Fiber Sheet Material," granted January 15, 1963. Any finish applicable to leather may be applied to the product.

The following examples are given as of possible assistance in understanding the invention; but it is to be understood that the invention is not limited to the specific materials or conditions shown in the examples:

*Example I*

43 lb. of salt calfskin scraps were unhaired, washed and added to 120 lb. of water containing 54 cc. of a commercial $H_3PO_4$ and 138 cc. of acetic acid. After stirring the hide scraps in, the pH was 3.1. The bath was allowed to stand six days with occasional stirring. At the end of this time the scrap material was well swollen and the pH was 4.0. The scraps were washed with cold water, drained, and run several times through a mill comprising closely spaced, relatively moving rough plates, i.e. a Bauer mill. The milled product weighed about 100 lb. To this were added 20 lb. of water containing 42 cc. of mixed acid (138 cc. of acetic acid and 54 cc. of phosphoric acid). After stirring and standing briefly the pH of the mix was 3.8. The mix was then sent through the Bauer mill again and 40 additional lb. of water and 100 cc. of the same acid mixture were added and stirred in. After standing overnight the pH of the mix was 3.7. To this mix there were added 20 lb. of water and 92 cc. of the same acid mixture and the mix was then sent through the Bauer mill using close set, fine plates and came out as a smooth pasty mass at pH 3.7. In this mass a high proportion of the collagen initially present was in solution. The mass was diluted with water to a solids content of 3%.

Pickled split cowhide trimmings were washed and brought to a pH of 8.5 by addition of sodium hydroxide. The trimmings were cut to approximately 1 in. pieces and 50 lb. of the trimmings were placed in a Hollander type paper beater with 150 lb. of water to give a solids content of about 5%. The beater was operated for ½ hr. at the end of which time the pH was readjusted to 8.5 and 300 cc. of 37% formaldehyde were added. The beating was continued for 5 minutes and the resultant slurry was allowed to stand for 2 hrs., then discharged onto screens and drained overnight. The drained material was passed through rubber squeeze rolls to bring its solids concentration to about 25%. The squeezed material was then put back in the beater and water added to bring the solids content in the beater to about 5%. The beater was operated for one hour with the beater knife close to the plate (0.003" to 0.005" clearance). The slurry was then removed from the beater and acidified with sulfuric acid to bring its pH to 4. This slurry was then drained overnight and squeezed through rubber rollers to give a fibrous mass of about 26% solids.

A chromium solution of the following composition was prepared:

| | Parts by weight |
|---|---|
| Chromic sulphate, $Cr_2(SO_4)_3 \cdot XH_2O$ | 10 |
| Water | 160 |
| Sodium formate | 5 |

The chromium solution was made by dissolving the chromic sulphate in the water and adding the sodium formate to the solution. The pH of this solution was adjusted to pH 4 by addition of sodium hydroxide. The resulting solution was allowed to stand for two days to stabilize with addition of further sodium hydroxide to maintain the pH at about 4. Analysis of the resultant chrome solution showed a chromic oxide content of 1.3% and a sodium formate concentration of 2%.

1,000 grams of 26% solids fibrous mass was added to 800 grams of the 3% solids material from the Bauer mill in a jacketed, worm-type mixer at a temperature of about 10° C. After mixing, 460 grams of the chromium solution was added and well mixed in to form a doughy, pasty mass having a pH of about 4. After the components were thoroughly mixed, the mixture was subjected to a vacuum to reduce the amount of entrapped air and other gases. The mixture was placed on a polyethylene sheet, covered with a sheet of polyethylene terephthalate resin and spread by rolling and working to a layer having a thickness of about 0.1 in. After forming the layer, it was allowed to stand at room temperature overnight. The polyethylene and polyethylene terephthalate sheets were stripped from the solidified layer of the mixture, and the layer was then immersed in a series of acetone baths to effect dehydration. After removal from the last acetone bath, the layer was soaked in a 4% solution of oleic acid in isopropyl alcohol for one hour. The layer was then withdrawn and allowed to dry. The dried layer resembled leather and on testing had a shrink temperature of 100° C.

The sheet was then passed between a reciprocating bar carrying needles on its lower surface and the sheet manipulated beneath the needle bar to provide an average of 1500 perforations in the sheet per square inch. The diameter of the holes was from about 0.1 to about 0.2 mm.

After the needling treatment a 20% solids solution of a butadiene acrylonitrile copolymer synthetic rubber latex was spread on the surface of the sheet. The latex contained 5% of a wetting agent (Triton X-200) and was spread on in amount to provide 5% solids based on the weight of the dried sheet. The sheet was dried and thereafter conventional acrylic resin emulsion finish was spread on the surface of the sheet and allowed to dry.

Thereafter the sheet was finished by conventional procedure including application of a commercial base coat containing pigment, wax and resin. The sheet was embossed by the usual commercial embossing procedure and finally a coat of an aqueous dispersion of lacquer was applied to a top coat and the sheet was plated. The resulting product resembled a good grade of natural leather.

*Example II*

120 lbs. of trimmings from green bated light (4–6 lb.) calfskins were placed in a drum and washed in running cold water at a drum speed of about 12 r.p.m. for about 12 hours to remove the salt. The trimmings were then drained and passed through a plate-type meat grinder of which the plate had 3/16 in. circular holes. The ground material was washed and drained, and the drained mass weighed about 80 lbs.

To the washed and drained mass 2.5 lbs. of glacial acetic acid were added and vigrorously stirred in. The acidified mass had a pH of about 3.75 and a dry solids content of about 10%, and was allowed to stand at room temperature for two days.

After standing the acidified skin material was cooled by mixture with chipped ice and passed through a plate-type shearing mill of which the plates had an edge clearance of about 0.005". The material left the mill as a smooth paste whitened by occlusion of fine air bubbles. On standing the air bubbles become aggregated, absorbed, or removed, leaving an opaque, tan-colored paste having a solids content of about 7%.

Pickled shoulder splits were washed in a rotating drum (12 r.p.m.) for two hours in running tap water. 35 lbs. of the washed trimmings were placed in a drum containing a buffered formaldehyde solution comprising 80 lbs. of water, 1600 ml. of glacial acetic acid, 1000 grams of sodium hydroxide and 700 ml. of 37% formaldehyde. The trimmings were agitated intermittently in the drum for a period of about 20 hours and at the end of this period had a pH of 4.9. The trimmings were washed for ½ hour and thereafter were drained. The material was cut into 1 in. strips and then passed through a chopper which reduced the strips to pieces ranging from about ½ in. to 1 in. The material was then introduced into a Hoilander type paper beater in which the material was beaten for 10 to 15 minutes after the "bumping," due to the presence of large lumps, had stopped. The beaten material which was a uniform suspension of hide fibers was drained on a 20 mesh screen. Sulfuric acid was mixed into the fiber mass to reduce its pH to about 3.4 and the mass of fibers was then passed between tightly pressed rubber rolls to remove additional water. At this point the formaldehyde content of the fibers was about 0.36% on a dry solids basis; and the dry solids content was about 25% of the pressed fiber mass.

Following the procedure of Example I, 2,000 parts by weight of the 25% solids collagen fiber mass was intimately mixed with 800 parts by weight of 7% solids paste material, 1390 parts by weight of a ⅓ basic chrome tanning solution at pH 2.6 containing 1% by weight of chromium calculated as $Cr_2O_3$, 450 parts by weight of water being added and mixing continued to form a doughy mass having a solids content of about 12% and a pH of about 3.5.

The resulting mixture was rolled out into a sheet following the same procedure as used in Example I and subjected also to the same finishing operations including the drying with acetone, the plasticizing using oleic acid solution, the needling treatment and the treatments with synthetic rubber latex and the acrylic emulsion finish. The resulting product resembled a good grade of natural leather.

Having thus described our invention, what we claim as new and desire to secure by Letters Patent of the United States is:

1. A method for forming shaped interlocked collagen fiber masses comprising the steps of intimately mixing collagen fibers, an aqueous solution of collagen and an aqueous solution of a collagen-reactive chromium tanning agent, said mixture having a pH of from about 2.5 to about 5 and having a chromium content of from about .02% to about 5% by weight calculated as $Cr_2O_3$ based on the combined weight of said fibers and dissolved collagen, then shaping said acidic mixture into a sheet before the reaction between said chromium compound and collagen has progressed to cause substantial insolubilization and precipitation of collagen from solution, thereafter completing the reaction between said chromium compound and collagen to precipitate collagen from solution collagen in the mixture and removing fluid from the sheet.

2. A method for forming shaped interlocked collagen fiber masses comprising the steps of intimately mixing collagen fibers, an aqueous solution of collagen in amount to provide from about 5% to about 20% by weight of dissolved collagen based on the weight of said fibers, and an aqueous solution of a collagen-reactive chromium tanning compound, said mixture having a doughy, pasty consistency, a pH of from about 2.5 to about 5 and having a chromium content of from about .02% to about 5% by weight calculated as $Cr_2O_3$, based on the combined weight of said fibers and dissolved collagen, then shaping said acidic mixture into a sheet before the reaction between said chromium compound and collagen has progressed to cause substantial insolubilization and precipitation of collagen from solution, thereafter completing the reaction between said chromium compound and collagen to precipitate collagen from solution collagen in the mixture, and removing fluid from the sheet.

3. A method for forming shaped interlocked collagen fiber masses comprising the steps of mixing collagen fibers, an aqueous solution of collagen in amount to provide from about 5% to about 20% by weight of dissolved collagen based on the weight of said fibers and an aqueous solution of a collagen-reactive chromium tanning compound, said mixture having a doughy, pasty consistency, having a temperature of not over about 10° C. and a pH of from about 2.5 to about 5, and having a chromium content of from about 0.2% to about 5% by weight calculated as $Cr_2O_3$ based on the combined weight of said fibers and dissolved collagen, then shaping said mixture into a sheet before the reaction between said chromium tanning compound and collagen has progressed to cause substantial insolubilization and precipitation of collagen from solution, thereafter completing the reaction between said chromium compound and collagen to precipitate collagen from solution in the mixture and to tan the existing collagen fibers and precipitated collagen as a shaped, interlocked, tanned collagen fiber mass and removing fluid from the sheet.

4. A method for forming leather-like sheet material comprising the steps of mixing collagen fibers, an aqueous solution of collagen in amount to provide from about 5% to about 20% by weight of dissolved collagen based on the weight of said fibers and an aqueous solution of a substantially one-third basic collagen-reactive chromium tanning compound, said mixture having a doughy, pasty consistency, having a temperature of not over about 10° C. and a pH of from 3 to 3.5 and having a chromium content of from about 2.5 to about 3% by weight calculated as $Cr_2O_3$ based on the combined weight of said fibers and dissolved collagen, and a solids content of from about 5% to about 20% by weight based on the weight of the mixture, then shaping said mixture into a sheet before the reaction between said chromium tanning compound and collagen has progressed to cause substantial insolubilization and precipitation of collagen from solution, thereafter warming the sheet to a temperature not higher than about 50° C. to complete the reaction between said chromium compound and collagen to precipitate collagen fibers from dissolved collagen in the mixture and to tan the existing collagen fibers and precipitated collagen fibers as an interlocked, tanned collagen fiber sheet, and removing fluid from the sheet.

5. A method for forming leather-like sheet material comprising the steps of mixing collagen fibers, an aqueous solution of collagen in amount to provide from about 5% to about 20% by weight of dissolved collagen based on the weight of said fibers and an aqueous solution of a masked collagen-reactive chromium tanning compound, said tanning compound solution containing from about one-half to about 4 parts by weight of masking agent comprising a member of the group consisting of ammonium and alkali metal salts of formic acid and hydroxy carboxylic acids to one part by weight of the chromium compound calculated as $Cr_2O_3$ present in the solution, said mixture having a doughy, pasty consistency having a temperature of not over about 10° C. and a pH of from 3.5 to 5 and having a chromium content of from about 2.5% to about 3% by weight calculated as $Cr_2O_3$ based on the combined weight of said fibers and dissolved collagen, and a solids content of from about 5% to about 20% by weight based on the weight of the mixture, then shaping said mixture into a sheet before the reaction between said chromium tanning compound and collagen has progressed to cause substantial insolubilization and precipitation of collagen from solution, thereafter warming the sheet to a temperature not higher than about 50° C. to complete the reaction between said chromium compound and collagen to precipitate collagen fibers from dissolved collagen in the mixture and to tan the existing collagen fibers and precipitated collagen fibers as an interlocked, tanned collagen fiber sheet, and removing fluid from the sheet.

6. A method for forming leather-like sheet material comprising the steps of mixing collagen fibers, an aqueous solution of collagen in amount to provide from about 5% to about 20% by weight of dissolved collagen based on the weight of said fibers and an aqueous solution of a substantially one-third basic collagen-reactive chromium tanning compound, said tanning compound solution containing about 1% by weight of chromium calculated as $Cr_2O_3$ and containing masking agent comprising a member of the group consisting of ammonium and alkali metal salts of formic acid and hydroxy carboxylic acids in amount up to one part by weight for 2 parts by weight of said chromium compound calculated as $Cr_2O_3$ based on the combined weight of said fibers and dissolved collagen, and a solids content of from about 10% to about 15% by weight based on the weight of the mixture, said mixture having a doughy, pasty consistency and having a temprature of not over about 10° C. and a pH of from 3.5 to 5, then shaping said mixture into a sheet before the reaction between said chromium tanning compound and collagen has progressed to cause substantial insolubilization and precipitation of collagen from solution, thereafter warming the sheet to a temperature not higher than about 50° C. to complete the reaction between said chromium compound and collagen to precipitate collagen fibers from dissolved collagen in the mixture and to tan the existing collagen fibers and precipitated collagen fibers as an interlocked, tanned collagen fiber sheet, and removing fluid from the sheet.

References Cited in the file of this patent

UNITED STATES PATENTS

| | | |
|---|---|---|
| 1,865,497 | Atwood | July 5, 1932 |
| 2,747,228 | Braun et al. | May 29, 1956 |
| 2,852,812 | Braun | Sept. 23, 1958 |
| 2,934,446 | Highberger et al. | Apr. 26, 1960 |
| 2,934,447 | Highberger et al. | Apr. 26, 1960 |
| 2,935,413 | Veis et al. | May 3, 1960 |

UNITED STATES PATENT OFFICE
CERTIFICATE OF CORRECTION

Patent No. 3,122,599                          February 25, 1964

Shu-Tung Tu et al.

It is hereby certified that error appears in the above numbered patent requiring correction and that the said Letters Patent should read as corrected below.

Column 2, line 6, for "a" read -- at --; line 64, strike out "now Patent No. 3,063,892,"; line 65, for "3,063,982" read -- 3,063,892 --; column 4, line 39, strike out "now Patent No. 3,073,714, and"; column 6, line 1, for "to" read -- as --.

Signed and sealed this 30th day of June 1964.

(SEAL)
Attest:

ERNEST W. SWIDER                               EDWARD J. BRENNER
Attesting Officer                                   Commissioner of Patents